(No Model.) 3 Sheets—Sheet 1.
F. E. CASE.
SURGICAL CHAIR.
No. 530,159. Patented Dec. 4, 1894.
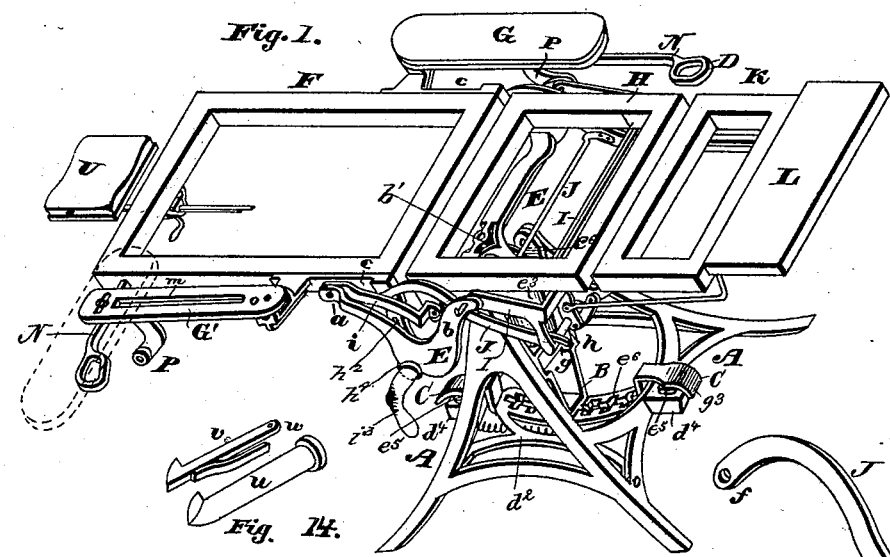
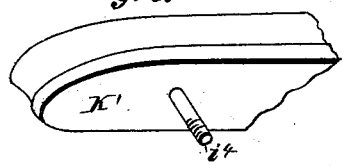
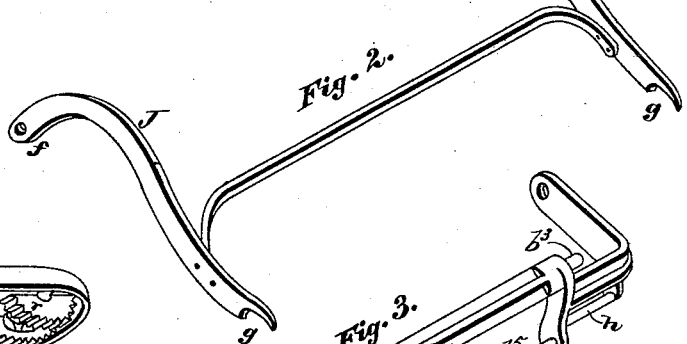
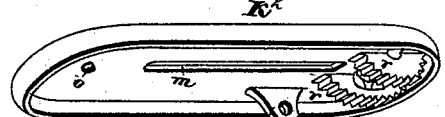
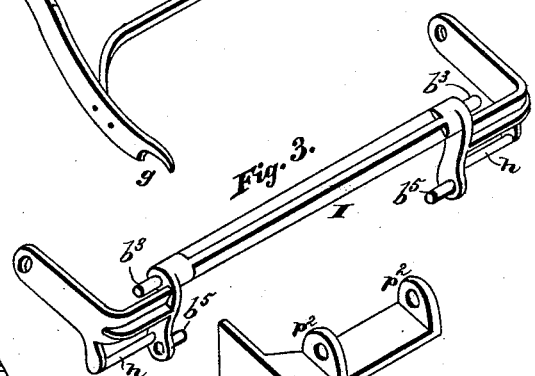
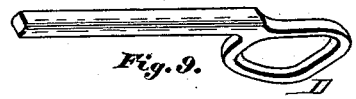
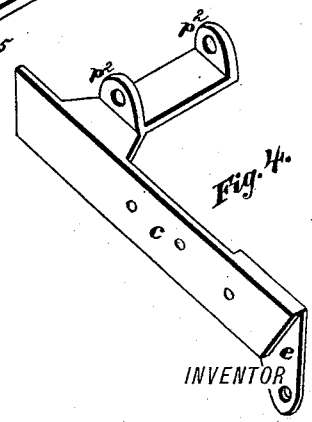
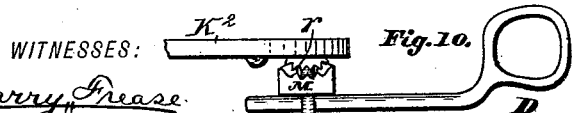
WITNESSES: Harry Frease, John E. Monnot.
INVENTOR Frank E. Case (No Model.) 3 Sheets—Sheet 2.
F. E. CASE.
SURGICAL CHAIR.
No. 530,159. Patented Dec. 4, 1894.
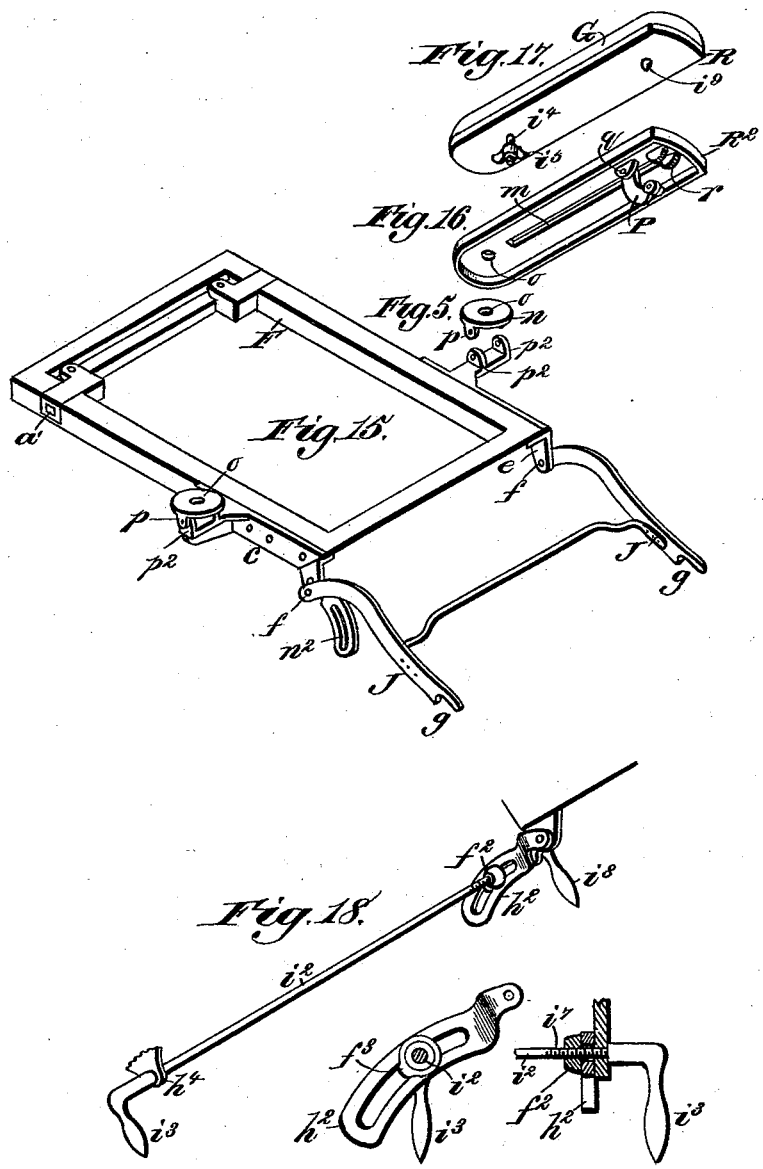

(No Model.)  3 Sheets—Sheet 3.
F. E. CASE.
SURGICAL CHAIR.
No. 530,159. Patented Dec. 4, 1894.
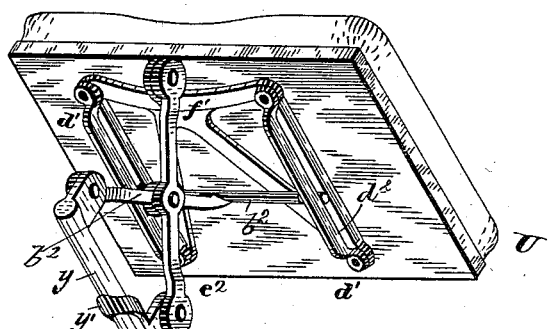
Fig. 11.
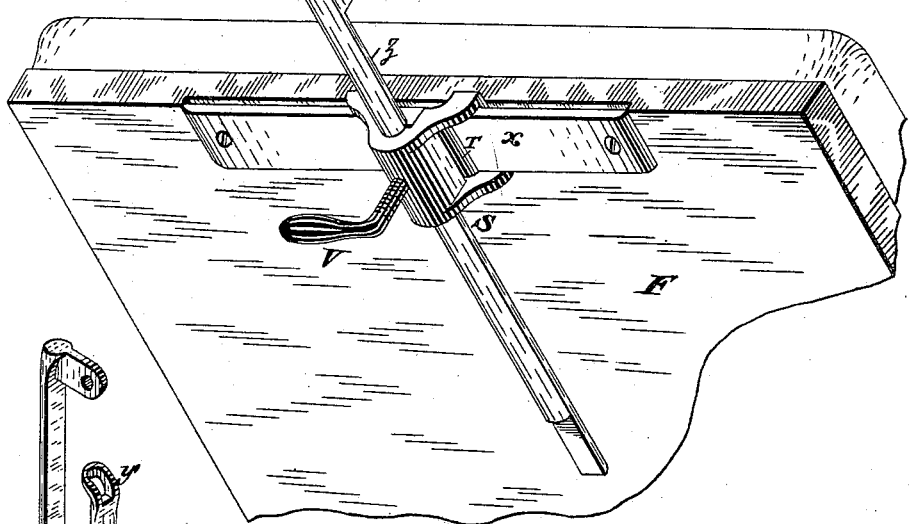
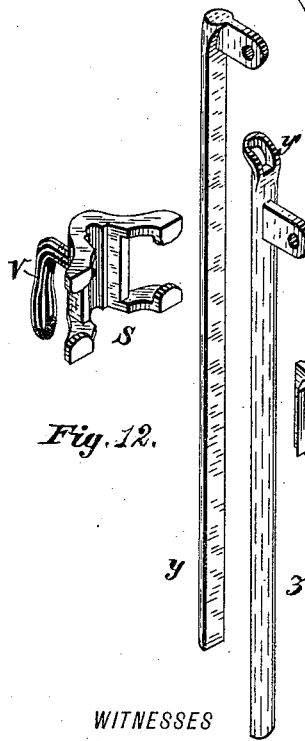
Fig. 12.
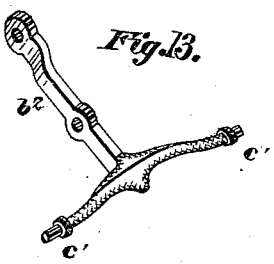
Fig. 13.
WITNESSES
Harry Frease
John E. Monnot
INVENTOR
Frank E. Case

UNITED STATES PATENT OFFICE.

FRANK E. CASE, OF CANTON, OHIO.

SURGICAL CHAIR.

SPECIFICATION forming part of Letters Patent No. 530,159, dated December 4, 1894.

Application filed February 2, 1887. Serial No. 226,217. (No model.)

*To all whom it may concern:*

Be it known that I, FRANK E. CASE, a citizen of the United States, residing at Canton, in the county of Stark and State of Ohio, have invented certain new and useful Improvements in Surgical Chairs, of which the following is a specification.

The objects of this invention are to improve surgical chairs, especially that type employed in the practice of gynecology; to provide a novel side-arm; to provide a novel stirrup mechanism and to provide a novel head-rest.

The objects of the invention are accomplished by the features and combination of devices hereinafter described and claimed, reference being made to the accompanying drawings, in which—

Figure 1 is a perspective view omitting the upholstery and showing the body of the chair adjusted to the reclining position. Fig. 2 is a detail perspective view of the duplex brace, for elevating the chair seat. Fig. 3 is a detail perspective view of the swing frame for supporting the front of the chair seat. Fig. 4 is a detail perspective view of the bracket for the side arm of the chair. Fig. 5 is a detail perspective view of one of the turn tables for the side arms; Fig. 6 a detail view of a part of the upholstered section of a side arm. Fig. 7 is a detail view of the lower section of a side arm, showing also its toothed washer. Fig. 8 is a detail view of a bolt and nut for securing a stirrup. Fig. 9 is a detail view of a foot supporting stirrup. Fig. 10 is a detail view showing the stirrup secured in position on the lower arm section. Fig. 11 is a view of the head rest for the back of the chair. Fig. 12 is a detail view of the head rest supporting and adjusting devices. Fig. 13 is a detail view of the brace forming a part of the head rest. Fig. 14 is a detail view of the hollow pin and spring catch for securing the swing frame and the block of a side arm to the rotary frame of the chair. Fig. 15 is a detail perspective view of the chair back omitting the upholstering; Figs. 16 and 17, detail views of the sections of a side arm; Fig. 18, detail views of devices for holding the chair back at different inclinations.

In order to enable those skilled in the art to make and use my invention, I will now describe the same in detail, referring to the accompanying drawings in which similar letters of reference indicate corresponding parts, and wherein—

A designates the chair base frame having the legs spread to avoid overturning; B, a pivoted rocking yoke or frame, and C a lock frame set in the base frame and adapted to slightly move in a vertical direction to engage a part of the rocking yoke or frame and hold the latter in the position to which it may be adjusted. The rocking yoke B is pivotally suspended in the chair base frame A, and at its lower end is adapted to engage the teeth $e^6$, Fig. 1, of the lock frame C. This frame can rise and fall and is normally held up in engagement with the yoke B by springs $e^5$ resting on lugs $d^4$ and bearing against ears or foot pieces, as at $g^3$ on the lock-frame C. By pressing on one of the ears or foot pieces $g^3$, the lock-frame is depressed and disengaged from the yoke B, so that the latter is free to be rocked. When pressure on the ear or foot piece $g^3$ is relieved the lock-frame springs upward into engagement with the yoke and locks the latter stationary.

A chair body supporting frame E, having at each end the arms $a$ and $b$, is provided at its center with a plain or screw threaded stem $b'$, swiveled in a tubular part $e^3$, of the rocking yoke, so that the frame can rotate in the latter while it rocks therewith, as in my Letters Patent No. 360,279, reissued March 6, 1888, No. 10,906.

The chair back F is provided at its lower end with rigidly attached side brackets $c$, pivotally secured to the arms $a$, of the rotary frame at points opposite each other and in practive about seven inches more or less from the lowest extremity of the back, and the side brackets are provided with pendent ears or lugs $e$, Fig. 15, to which are pivoted the rear ends $f$, of what I term a duplex brace J, in that it comprises two rigidly connected brace arms having at their front ends the notches or shoulders $g$, that bear against or engage the rods or pins $h$, of a swing frame I, pivotally suspended from the front arms $b$, of the rotary frame.

The chair seat H, at its forward portion is pivotally connected to the swing frame by suitable pivots as at $b^3$, Fig. 3, while at its rearward portion it is hung by pivoted links $i$, from the rear arms $a$, of the rotary frame, the construction and arrangement of the several parts being such that as the upper end of the chair back is turned downward the lower extremity of the back is carried forward and upward, thereby moving the duplex brace J, forward and upward, and the latter, by its engagement with the rods or pins $h$, raises the swinging frame I, and elevates the front part of the seat H, and at the same time moves it slightly forward.

The rocking yoke B, lock frame C, leg rest K, and foot rest L, are constructed and operate substantially as described and shown in my Letters Patent No. 360,279, reissued March 6, 1888, No. 10,906.

The chair back is provided at its lower extremity with a slotted link $h^2$, one or more, preferably forming a part of a bracket $c$, and through link and perforated ears $h^4$, of the rotary supporting frame E, passes a transverse rod $i^2$, having a suitable handle $i^3$, at each end and furnished with a screw thread $i^7$, Fig. 18, engaging a screw nut $f^2$, located at the inner side of the slotted link and having a lug $f^3$, engaging the slot in the latter so that when the transverse rod is rotated in one direction by either of its handles, the nut, held by the lug $f^3$ against rotation, is drawn upon the slotted link to clamp the latter firmly against the inside of one ear $h^4$, for the purpose of setting and rigidly holding the chair back at any desired inclination. The back can be adjusted to a semi-reclining position and locked by the rod, link and nut, and then by giving the chair body the backward tilt by swinging the yoke, the back is brought to or near the horizontal position and the front of the seat elevated, to elevate the hips of the patient.

The side arms G, G', of the chair each comprise two sections K', $K^2$, the upper one having upholstering and resting on the lower one where it may be held by a stem $i^4$, passing through a slot or perforation $m$, and having thumb nut $i^5$, to clamp it in place. The bracket $c$, or the back F, is provided with ears $p^2$, to which is pivoted the ears $p$, of a turn table $n$, and the lower arm section $K^2$, is swiveled or pivoted to the turn table at the central point $o$, thereof, Figs. 5, 15, 16 and 17. The connection of these parts constitutes a double hinge or pivot supporting the rear end of the arm whereby the latter may be swung around by means of the turn table as at the right hand side of the chair, Fig. 1. The front end of the side arm is furnished with a pendent lug $q$, Figs. 7 and 16, to which is pivoted a block P, that is in turn pivoted to the front arm $b$, of the rotary frame as hereinafter explained, the distance from the points $b$ and $q$, being equal to or about the same as the distance from the points $a$ to $p^2$, so that as the back is lowered the side arm is caused to drop down and back and at the same time preserve its horizontal position. While the side arm is thus lowered the block P can be detached from the arm $b$, through the medium of a pin and catch Fig. 14, hereinafter described, to permit the side arm to be swung around on the turn table $n$ to the side of the back as before mentioned, thus placing the arm away from the side of the seat H, for the convenience of the operator in the peformance of certain surgical operations.

The forward end of the lower arm section $K^2$, is furnished with an arc shaped enlagement having a circular series of teeth or cogs $r$, to engage corresponding teeth in a washer M, Figs. 7 and 10, and under the washer is located a stirrup comprising a shank or stem N and a loop D, the former of which is held in the eye or loop of a bolt O, passing through the washer and lower arm section and secured by a screw nut to clamp the washer in engagement with the teeth or cogs on the arm section, the nut, preferably, being oval on its under side Fig. 8, to work in a cavity in the arm section. The shank or stem of the stirrup is thicker in one direction than the other with two opposite corners rounded and two square so that by turning the shank or stem in the loop-bolt to present the thinner side to the washer, the latter can fall out of engagement with the teeth $r$, to permit the stirrup to be inclined in either direction or to swing around with the loop-bolt while the washer rests at all times by its flat under side upon the shank or stem of the stirrup. The loop-bolt extends through an enlarged hole in the lower arm section to permit freedom of movement of the bolt and provide for its maintaining a position at right angles to the stirrup shank. This construction and arrangement secures the universal movement of the stirrup. By turning the stirrup one quarter around the eye or loop of the bolt being sufficiently large for that purpose, so that the thicker side of the shank or stem is against the washer, the latter is forced up into engagement with the teeth $r$ for locking the stirrup at the angle of inclination to which it may be placed.

The loop D of the stirrup is arranged to project laterally from the shank or stem in such manner that the weight and pressure of a patient's foot tend to turn the stirrup with the square corners of the shank N, bearing respectively against the washer M and the loop-bolt O, so that the greater the pressure of the foot the more firmly and rigidly are the washer and stirrup held in proper position by reason of the wedging action of the washer in its engagement with the teeth of the lower arm section. The stirrup shank when locked is always at the same angle of inclination as the lower flat side of the washer and as the tendency of the shank to turn by pressure on the stirrup loop jams or wedges the washer into engagement with the teeth or cogs $r$, the construction is very satisfactory, reliable and safe.

The side arm of the chair when turned against the back F, Fig. 1, may be supported in that position by inserting the stirrup shank into a socket $a'$, Fig. 15, provided for that purpose, but obviously the side arm can be otherwise supported at its free end when turned against the side of the back. The upper section K', of the side arm is free to turn pivotally by its stem $i^4$, working in the slot or perforation $m$ of the lower section K², whereby the upper section can be swung outwardly to occupy the position shown by dotted lines Fig. 1, and thereby serve as a suitable and convenient support for the hand and arm of a patient being operated on. The upper arm section may be provided on its under side, at the end portion opposite the stem $i^4$ and nut $i^5$, with a pin or projection $i^9$, to enter the slot $m$, for holding the upper arm section against a lateral swinging motion unless the pin or projection be disengaged from the slot by slightly lifting the upper arm section after the nut $i^5$ is loosened.

The ends of the swing frame I, are pivoted to the front arms of the rotary frame by pivot pins represented in Fig. 14, that also serve to secure the blocks P, of the side arms, for which purpose the said pivot pins extend a sufficient distance outside the arms $b$ to pass through the orifices in the lower ends of the blocks P when the side arms G, G', are in their normal position at the sides of the chair seat. The pivots Fig. 14, each comprise three parts, the hollow pin $u$, the catch $v$ and the spring $w$, the two latter working inside the pin and being so adapted that when a block P, is arranged in place on the pin the acting end of the catch is pressed laterally outward by the spring and engages the block to hold it in position, while to remove the block from the pin it is only necessary to depress the acting end of the catch into the tube.

I do not confine myself to the side arm pivoted at its front end to the block P, and at its rear end to a bracket on the chair-back, as modifications of this arrangement can be made without affecting the spirit of my invention.

The chair back carries at its upper end the adjustable head rest U, as follows: A plate $x$ is secured to the back and is engaged by lugs on a slide S, and between the plate and slide is arranged to work a washer T, the slide and washer being so constructed that when in position they form part of a clamp and provide a round hole for the admission of two half round stems $y$ and $z$ that work together. A set screw V constituting a part of the clamping mechanism is provided so that by tightening the clamp the stems are forced rigidly together and they in turn bear against the washer T which is pressed against the plate $x$, the whole being thus firmly set to the chair while by loosening the set screw V of the clamp, the slide S is free to move on the plate $x$ to the right or left and the stems $y$, $z$, to move up or down or to turn axially for correspondingly adjusting the head rest. The stem $y$ is provided at its outer or upper end with an ear to which is pivoted a brace lever $b^2$, adapted to slide in the slot $d^2$, and to the stem $z$, is pivoted one end of a brace lever $e^2$, having its other end secured to the plate $f'$, rigidly fixed to the head rest U, the said brace levers being pivotally united at their center. The stem $z$, is provided with a loop $y'$, working over the stem $y$, to hold the two stems together, but obviously this effect can be accomplished by other means. As the two stems slide in opposite directions on each other, the head rest carried by the brace levers $b^2$, $e^2$, will be thrown backward or forward according to the direction in which the stems are moved.

The parts constructed as set forth are capable of adjusting the head rest to the right or left, upwardly and downwardly and backward and forward, while the stems can axially turn to rotate the head rest to the right or left.

I do not wish to be understood as herein claiming the combinations that are claimed in my Letters Patent above alluded to.

What I claim is—

1. The combination of a base frame A, a rotary supporting frame E, thereon, a back F having a rigidly attached bracket $c$, a turn table $n$ pivotally attached to the bracket, and a side arm pivoted to the turn table and having a pivoted block P, adapted to pivotally engage the supporting frame substantially as described.

2. The combination in a chair of a supporting frame E, a block P detachably pivoted thereto, a back F having a rigidly attached bracket $c$, a turn table $n$, pivotally attached to the bracket and a side arm pivotally attached to the turn table and to the block and composed of two sections, one having a perforation and the other having a stem to work in the perforation and adapted to swing at right angles to the other section, substantially as described.

3. The combination in a chair, of a supporting frame E, a chair back F, connected to the frame, a seat H, and side arms G, G', each composed of two sections pivotally supported at their rear ends, the lower section detachably connected at its front end with the supporting frame to swing around beside the chair back and the upper section capable of swinging on a pivot to a position at right angles to the lower section, substantially as described.

4. The combination in a chair having a back, of a supporting frame and a side arm having a rear pivotal support and a detachable pivotal connection at the front end with the supporting frame and comprising two sections detachably connected at one end, both said sections being capable of swinging on the rear pivotal support to a position beside the chair back and the upper section movable on a pivot to a position at right angles to the lower section, substantially as described.

5. The combination in a chair, of a supporting frame, a swinging back pivotally connected to the frame and a side arm composed of two pivoted sections, one having a stem and the other a perforation through which the stem passes, and one of said sections being capable of swinging on a pivot to a position at an angle with the other section, substantially as described.

6. The combination in a chair, of a supporting frame, a side arm composed of two sections pivoted together and one adapted to swing on said pivot to a position at right angles to the other section, and a back pivotally connected with the supporting frame to swing down to a level with the side arm, substantially as described.

7. In a chair, the combination with a supporting frame of a swinging back and a side arm pivotally connected with the back and composed of two superposed sections pivoted together, the upper section adapted to swing on the lower section to a position at right angles thereto, substantially as described.

8. The combination in a chair, of a supporting frame, a chair back connected with the frame, a side arm pivotally supported at its rear and having a detachable pivotal connection at its front end with the supporting frame and capable of swinging around on its rear pivotal connection to a position beside the chair-back, and a stirrup supported by the front end of the side arm and adapted to engage with the chair-back when the side arm is swung beside the latter, substantially as described.

9. The combination in a chair, of a supporting frame, a back connected with the frame, a seat connected with the frame, a side arm having a rear pivotal connection with a part of the chair and a hollow pin having a spring catch to pivotally connect the front end of the side arm with the supporting frame, substantially as described.

10. The combination with a support having on one side a toothed, segmental-shaped projection $r$, of a washer M, having a toothed cavity to receive the said segmental projection and provided with a flat side, a loop bolt O extending through the washer and the support and an axially turning stirrup-carrying shank having a flat side and opposite rounded corners and made of less thickness in one direction than in the other, so that when turned axially in the loop-bolt the toothed washer will be forced into engagement with the toothed segment and the stirrup thereby locked at the inclination to which adjusted, substantially as described.

11. The combination with a support having a segmental series of teeth, of a toothed washer having a flat underside and adjustable on the segmental teeth, a loop bolt loosely passing through the washer and support and a stirrup having a flat shank passing through the loop of the bolt and bearing against the flat under side of the washer for adjusting the outer end of the stirrup to different heights, substantially as described.

12. The combination with a support having a segmental series of teeth, of a toothed washer, a loop bolt passing through the washer and support and adapted to axially rotate in the latter and a stirrup having a shank passing through the loop of the bolt and made thinner in one direction than the other so that when the shank is turned with its thinner portion presented to the under side of the washer and the lower portion of the bolt loop the washer will fall from disengagement with the segmental series of teeth, substantially as described.

13. In a chair the combination with a head rest, of two stems, having devices connecting their upper ends together carrying the head rest said stems being movable in opposite directions to adjust the head rest to various positions, and a clamp for rigidly clamping the two stems one against the other in fixed relation to each other and also clamping and connecting them to the chair, substantially as described.

14. The combination with a chair body having a plate $x$, of a head rest U, the slide S, engaging the plate, a washer T, between the slide and the plate, a stem or support carrying the head rest and extending between the slide and washer and a clamping set screw V which binds the stem or support between the nut and slide and clamps the slide to the plate, substantially as described.

15. The combination with a chair body and a head rest of two semi-cylindrical stems, the brace levers on the stems supporting the head rest, a set screw, and a slide on the chair back receiving the stems and by the set screw binding them rigidly together and to the chair body, substantially as described.

16. The combination with a chair body, of a head-rest, two stems movable in opposite directions, brace levers pivoted together intermediate their ends, connected to the head-rest and pivoted respectively to the stems, and a clamp for rigidly clamping the two stems one against the other in fixed relation to each other and also clamping and connecting them to the chair body, substantially as described.

17. The combination with a suitable support, of a head-rest, two stems adapted to slide in opposite directions, means for connecting the head rest with the stems, and a clamp which serves to clamp the stems to the support and to rigidly lock such stems in contact with each other, substantially as described.

18. The combination with a suitable support, of a head-rest, two stems adapted to axially rotate and to slide lengthwise one upon the other, means for pivotally connecting the head-rest with the two stems, and a clamp to lock the two stems together, substantially as described.

19. The combination with a chair body, of two stems movable one upon the other and carrying a head rest, a slide engaged with the chair body and a screw which rigidly clamps the stems one against the other and also clamps the slide in position on the chair, substantially as described.

20. In a surgical chair, the combination of a supporting frame, a back pivotally connected with the frame, a seat connected with said frame, a chair arm and a hinge or joint connecting the chair arm at or near its rear end to the pivoted back, said hinge or joint being adapted to allow the chair arm to be turned thereon horizontally and also in a vertical plane to a position beside and parallel with the side edge of the swinging chair back, substantially as described.

21. The combination with a surgical chair, of a stirrup having a shank capable of being axially rotated and a locking mechanism actuated by the axial rotation of the stirrup shank to rigidly secure the stirrup at any desired angle of inclination.

22. In a chair, a side arm composed of two superposed sections connected by a vertical pivot adjacent to one end and the upper section adapted to swing in a horizontal plane at right angles to the lower section, and a support for the side arm on which the two superposed sections can be swung horizontally, substantially as described.

23. A chair, having a side arm composed of two superposed sections adapted to swing together in a horizontal plane and the upper section pivotally connected to swing in a horizontal plane on the lower section, substantially as described.

24. A chair having a side arm composed of two superposed sections one having a longitudinal slot and the other a stem passing through the slot, and the upper section adapted to swing in a horizontal plane on the lower section, substantially as described.

25. A chair having a side arm composed of two superposed sections of substantially equal length and width, both sections capable of swinging in a horizontal plane and the upper section capable of swinging horizontally independent of the lower section.

26. A chair having a back adapted to be brought to a horizontal position, and a side arm composed of two sections pivotally connected with each other, and having a hinge-connection with the chair-back so that the upper section may be turned at right angles to the lower section and at right angles to the chair back when the latter is in the horizontal position.

FRANK E. CASE.

Witnesses:
JOHN E. MOUNOT,
LORIN C. WISE.